March 14, 1961  L. A. BOLES ET AL  2,974,699
ONION TOPPER AND SLICER
Filed March 5, 1958  5 Sheets-Sheet 1
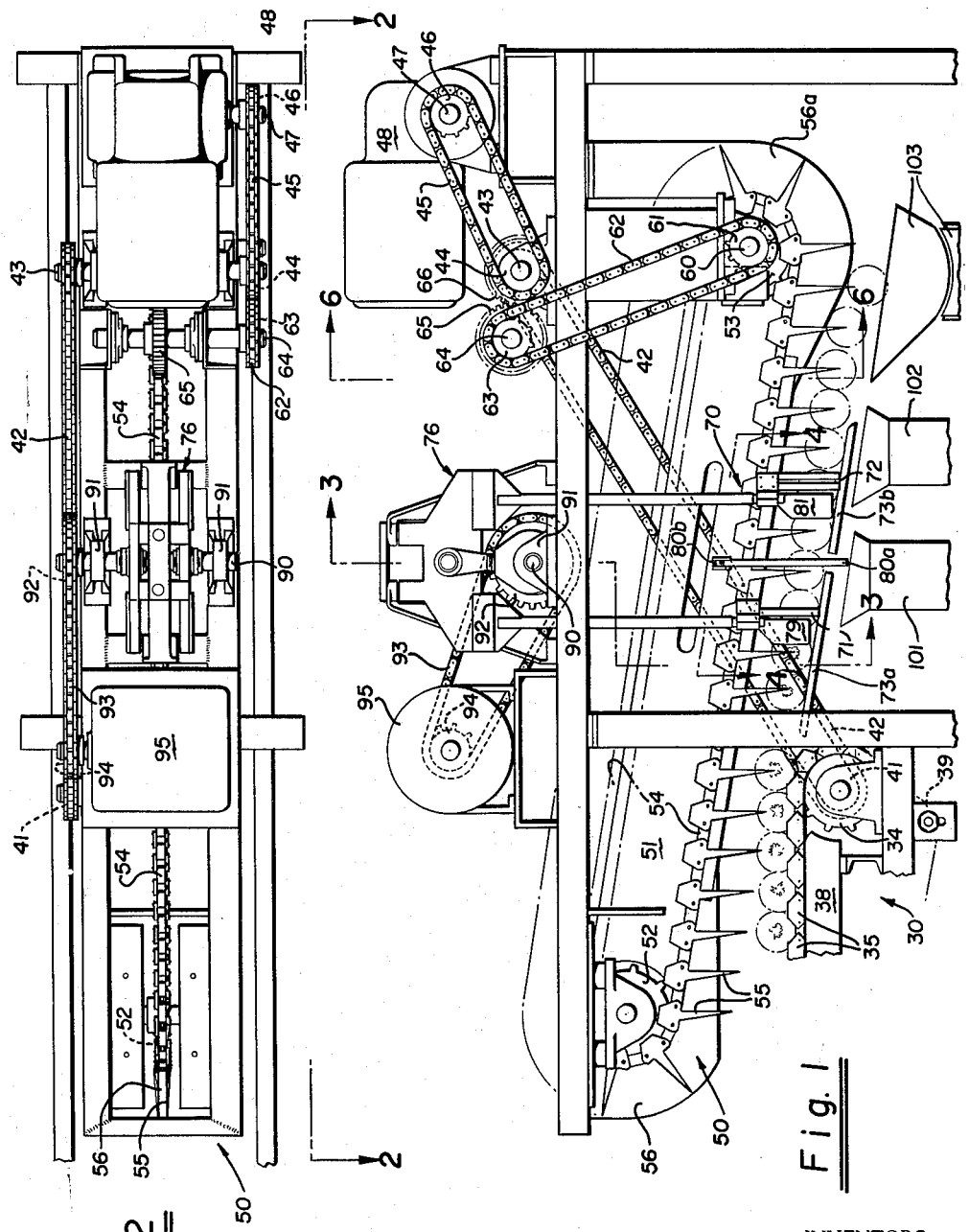
INVENTORS
Lester A. Boles
Harry C. Lundgren
David M. Daniel
BY
Attorneys INVENTORS
Lester A. Boles
Harry C. Lundgren
David M. Daniel
BY
Flehr and Swain
Attorneys

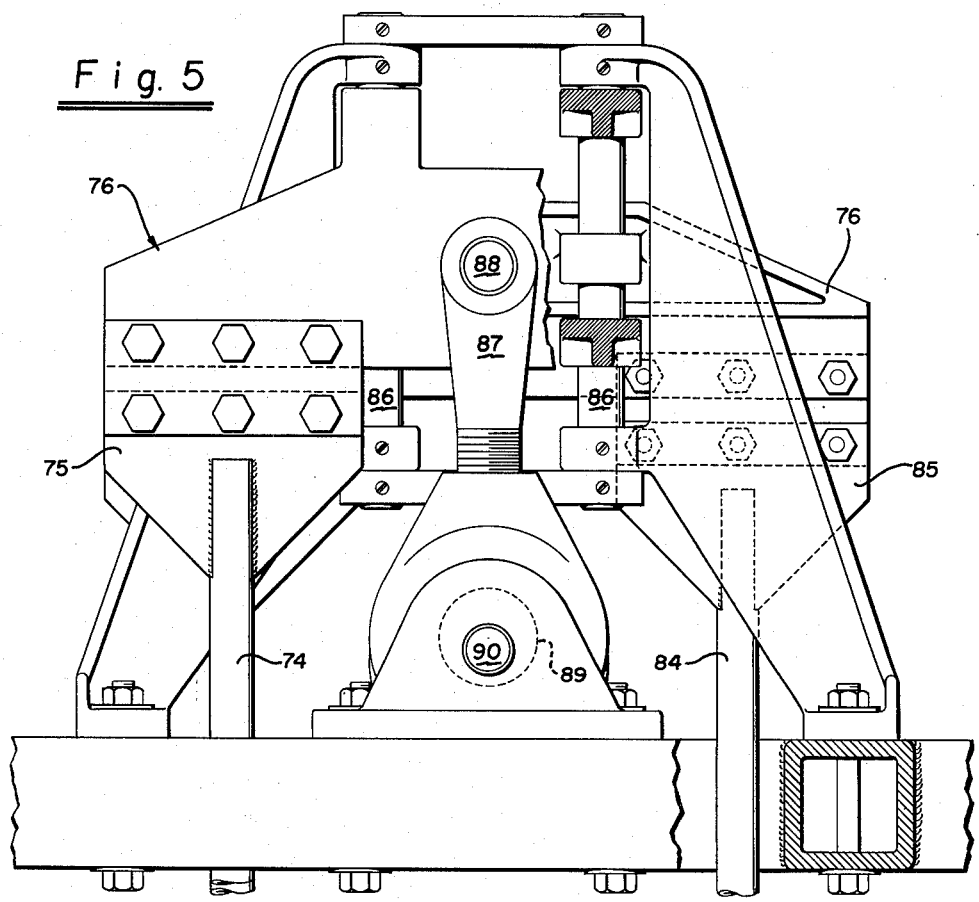
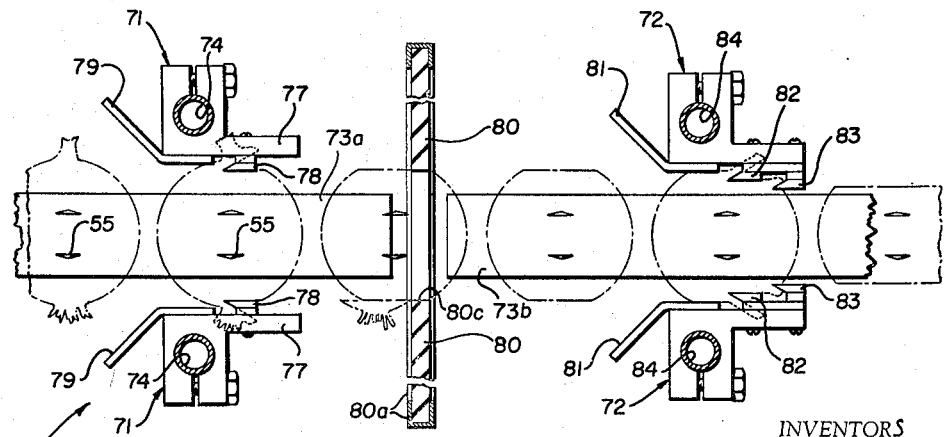

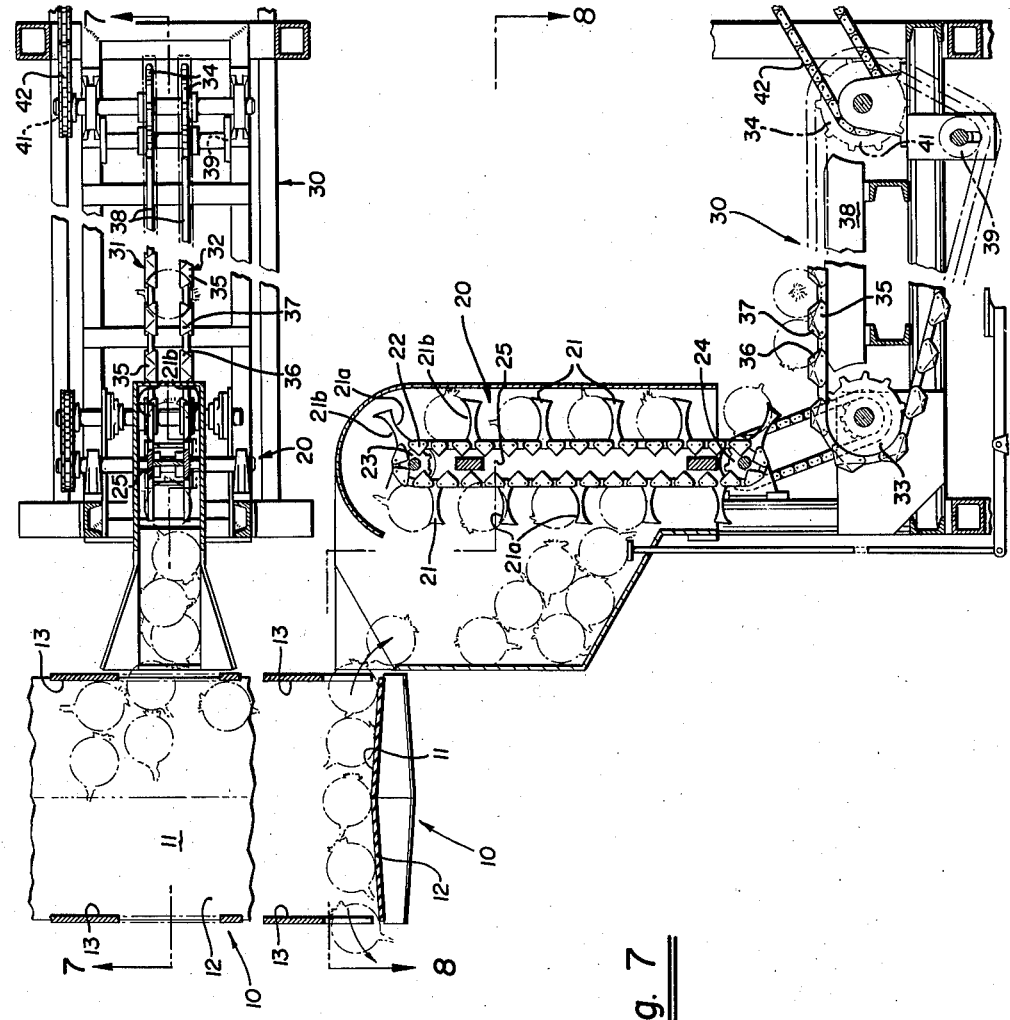

United States Patent Office 2,974,699
Patented Mar. 14, 1961

2,974,699

ONION TOPPER AND SLICER

Lester A. Boles and Harry C. Lundgren, Vacaville, and David M. Daniel, Berkeley, Calif., assignors to Basic Vegetable Products, Inc., San Francisco, Calif., a corporation of California Filed Mar. 5, 1958, Ser. No. 719,251

3 Claims. (Cl. 146—83)

This invention relates to onion toppers and particularly to devices of this kind which are adapted to remove the root and crown portions from onions.

The root and crown portions of onions are the less desirable portions of the onion. They are hard and undesirable in appearance and are not readily utilizable in a commercial form.

The larger center portions of onions from which the root and crown have been removed are desirable for drying and for the production of onion rings for onion soup, and, as a matter of fact, for the production of any product in which uniform appearance, and the large size of the onion ring, are necessary or desirable features.

Generally the roots and crown of onions have been removed by hand. Such hand operations are laborious and, with the present high cost of labor, expensive.

Some types of mechanical devices have been utilized for the removal of the roots and crowns of onions but generally these devices treat all sized onions in the same manner. In other words, the devices had to be set to remove the root and crown from the smallest onion in a plurality of onions and for this reason the devices customarily removed an excessive part of the onion from larger onions. It was practically impossible to set such a device for onions of different sizes and therefore it has been necessary to size or otherwise grade the onions before introducing them into devices of the kind which are described. The grading of the onion has introduced an additional step in the process which is undesirable, and, because of our invention, unnecessary as will be further shown.

Various sensing devices have been utilized to overcome the grading and sizing problem but in the past all of these sensing devices have been complex and their construction has been difficult and their operation and maintenance have been both unreliable and expensive.

It is an object of this invention to provide a simple device which may be caused to operate on any size of onion to automatically remove the root and crown.

It is a further object of this invention to provide a device which securely impales the onion during the crown and root removal process and which permits the removal of a predetermined number of slices from the onion and which automatically removes the cut portions from the onion.

Other objects and advantages of this invention will appear from the following specification taken in conjunction with the accompanying drawing in which:

Figure 1 represents a side view of the impaling and slicing device,

Figure 2 represents a top plan view of the device illustrated in Figure 1,

Figure 3:
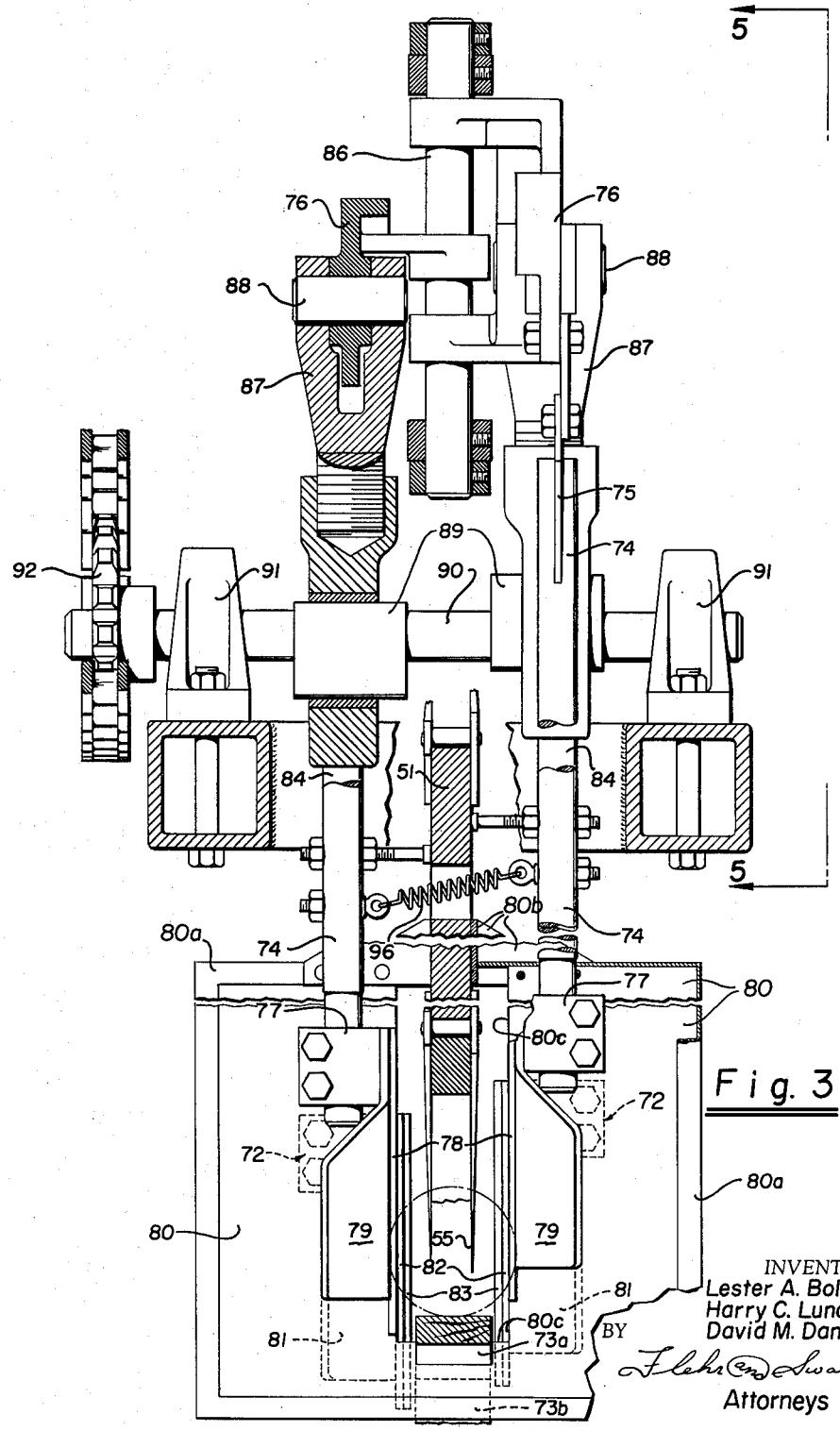
Figure 6:
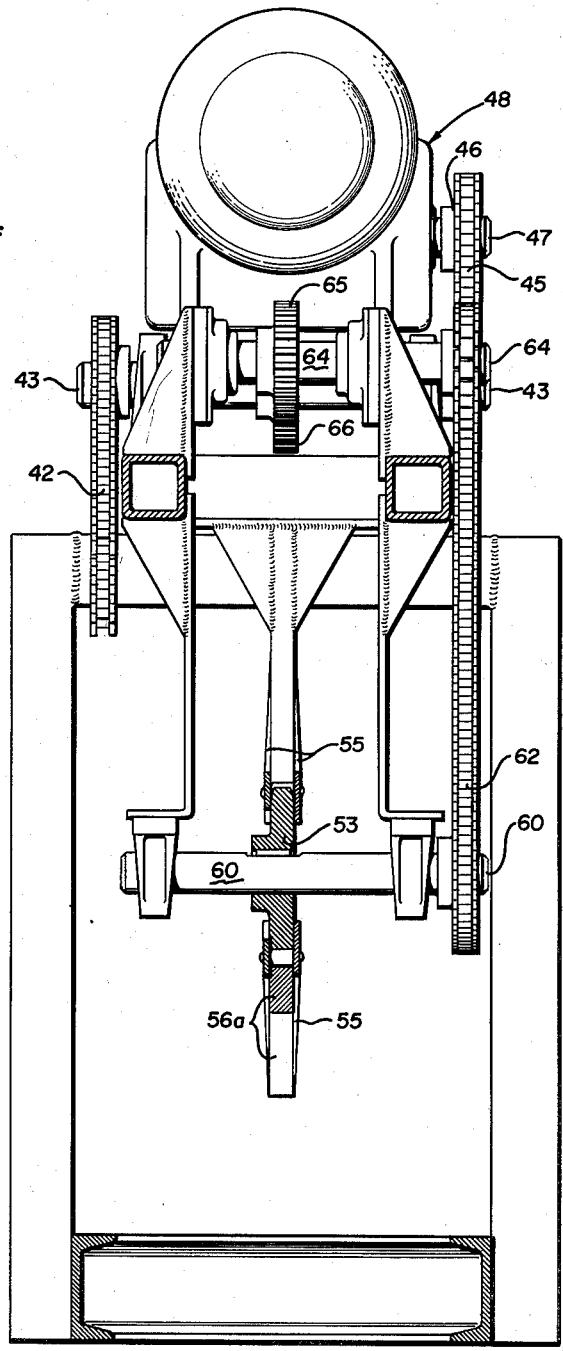

Figure 3 represents an enlarged cross-sectional detail taken along the line 3—3 of Figure 1, Figure 4 is an enlarged cross-sectional detail taken along the line 4—4 of Figure 1, Figure 5 is an enlarged side view of the knife actuating mechanism as illustrated in Figure 3, Figure 6 is an enlarged detail taken along the line 6—6 of Figure 1, Figure 7 is a side elevational view of the elevator and lowering mechanism by which onions are positioned upon a feeding belt, and, Figure 8 is a top plan view of the device as illustrated in Figure 7.

Generally speaking this device consists of an endless conveyer mechanism 10 from which onions are discharged to an elevator and lowering mechanism 20. The onions are discharged from the mechanism 20 onto an elongated horizontal conveyer mechanism 30 upon which the onions are positioned manually so that they are axially aligned with their crown and root portions horizontally aligned so that the normally horizontal axis of the onion is coplanar with the longitudinal axis of the conveyer 30. The conveyer 30 moves the onions to the right as viewed in Figure 2 to a position under an impaling mechanism 50 which consists of a plurality of impaling blades carried on a chain which is advanced at the same rate as the conveyer 30. The impaling mechanism 30 then advances the impaled onions between one or more sets of knives 70 which cut the crown and root portions from the onion along parallel vertical planes. The severed portions are stripped from the onion. The onion is removed from the impaling mechanism 70 by virtue of a cam arrangement which engages the onion and urges it off the impaling blades as the blades further advance.

The entire assembly is suitably mounted on a framework assembly which may be made of any suitable material such as angle iron and which may vary in size and shape to support the hereinafter described mechanism in a particular location in a packing plant.

As viewed particularly in Figures 7 and 8 the conveyer 10 consists of a trough-like member whose bottom wall 11 is sloped and which supports a conveyer belt 12. Onions are advanced along the trough 10 by the conveyer belt 12 and are normally urged into engagement with the side wall 13 of the trough 10. At predetermined points along the trough 10 we have provided suitable openings through which onions may drop by gravity. As the onions pass through the openings they pass into the upward path of travel of the conveyer mechanism 20 and are engaged by one of the onion supporting paddles 21. The onion supporting paddles 21 are concave on both sides. The conveyer 20 consists of an endless chain 22 to which the paddles or elevator members 21 are secured and the endless chain conveyer is supported by a pair of sprockets 23 and 24 which are suitably and rotatably mounted to actuate the chain 22. As the onion is engaged by the upper surface of the paddle 21 it is raised upwardly about the sprocket 23. It is apparent that at that point the onion which has previously been supported by the concave surface 21a will then drop downwardly and be supported by the upper concave surface 21b of the next preceding member 21. The onion will then be brought downwardly at a predetermined rate of speed and as the paddle on which it is supported approaches the lower sprocket 24 the onion will be discharged from the member 21 onto the horizontal conveyer 30.

The construction of the conveyer 10 and the elevator discharge mechanism 20 may be varied to accommodate different situations. However, the purpose and function of the assemblies 10 and 20 is to deliver onions, one at a time, at predetermined intervals and at a predetermined rate to the horizontal conveyer 30 as will more fully hereinafter be described and any mechanism which will perform that function will be satisfactory.

The horizontal conveyer member 30 consists of a pair of chains 31 and 32 which are substantially identical and which are supported by pairs of sprockets 33 and 34.

The chains 31 and 32 are provided with a plurality of identical enlarged lugs 35 which are formed generally as indicated in Figures 1, 7 and 8. Adjacent sets of lugs 35 form onion receiving pockets as indicated in Figures 1, 7 and 8. More specifically, each of the lugs 35 is provided with a pair of generally angular disposed faces 36 and 37 (Figures 7 and 8), and an onion is adapted to be supported in the pocket or cup formed by the faces 36 on one pair of lugs 35 and the faces 37 on the preceding pairs of lugs 35.

We have provided a table 38 which immediately underlies the horizontal conveyer 30 and which supports the upper run of the same against sagging between the sprockets 33 and 34. An idler sprocket 39 is provided and its purpose is to maintain proper tension on the conveyor 30 and the chains 31. The sprocket 34 is keyed to a suitable shaft to which there is likewise keyed another sprocket 41 which is adapted to be driven by a chain 42. A suitable drive connection between the elevator mechanism 20 and the horizontal conveyor 30 is likewise provided in such a manner that the linkage between the elevator 20 and the horizontal conveyor 30 is such that the conveyer 20 will deliver an onion to each of the previously described pockets formed by successive pairs of lugs 35. In this manner each of these pockets will be provided with an onion and each of the onions discharged from the conveyer will be discharged into an empty pocket.

The chain 42 engages a sprocket mounted upon a countershaft 43 to which there is also keyed a sprocket 44 which is driven by a chain 45 which, in turn, is driven by a sprocket 46 mounted upon a shaft 47 and adapted to be actuated in response to a suitable motor and gear drive arrangement 48. The sprockets 41, 44 and 46 are identical so that the driven sprocket 41 and the driving sprocket 46 rotate at the same speed.

Impaling mechanism 50 consists generally of an elongated guide bar 51 which is supported in any suitable manner and at the ends of which there are mounted a pair of sprockets 52 and 53. The sprockets 52 and 53 serve to drive an endless chain 54 about the bar 51. The chain 54 is provided with a plurality of pairs of identical impaling knives 55 which are supported thereby and which extend as indicated in Figure 1.

The guide bar 51 defines one side of the path of the articulated chain 54. A secondary guide member 56 is likewise provided which defines the other side of the path and which performs a further camming function as will more fully hereinafter be described. The member 56 consists of a plate-like member which is coplanar with the guide bar or blade 51. The side walls of the members 56 and 56a lie closely adjacent the impaling knives and serve as a guard in that their width is slightly greater than the length of the impaling knives whereby the impaling knives may be caused to rotate about the blade 51 in such a manner that their accidental engagement by an employee, for example, is rendered substantially impossible. The only place at which the impaling knives 55 are exposed is on the lower run of the member 54 as illustrated in Figure 1. The portion 56a performs another function as will more fully hereinafter be described.

As the onions are advanced by the horizontal conveyer assembly 30, they are manually turned in such a manner that their longitudinal axis, or the axis between the root and crown portions is transverse to the path of travel of the conveyer 30 and the root and crown portions extend laterally as illustrated in Figure 8. As the onions are advanced by the member 30 they will be brought into position under the impaling knives 55. The sprocket 53 is keyed to a shaft 60 to which there is also keyed a sprocket 61 which is driven by a chain 62 which, in turn, is driven by a sprocket 63 which is keyed to a shaft 64 to which a gear 65 is likewise affixed. The gear 65 is in constant mesh with an identical gear 66 which is keyed to the shaft 43 which, it will be recalled, is driven by chain 45 and the motor 48. The gear 66 is likewise driven at the same rate of speed as the sprocket 46 with the result that the sprocket 61 is likewise driven at the same rate of speed as the sprocket 46, and thus the impaling knives 55 are advanced at the same rate of speed as are the onions between the series of lugs 35 on the horizontal conveyer assembly 50. The timing of the impaling mechanism and the horizontal conveyer is critical and the positioning of the cups or onion supporting areas defined by the lugs 35 is such that as the onion is advanced under the impaling mechanism, a pair of impaling knives 55 are immediately over the center of the onion. It will be noted that the impaling knives are advanced downwardly while the onions are advanced on a horizontal plane by the conveyer assembly 30 with the result that the impaling knives 55 will first engage the onion and then will be urged downwardly into the heart of the onion. Thus the onions will be carried by the impaling knives 55 from the conveyer assembly 30 into a cutting zone where the onions will be engaged by the knives or cutting mechanism 70.

The knives or cutting mechanism 70 consists of two pairs of knives 71 and 72. The onions move to the right, as viewed in Figure 4. Each onion is impaled upon one of the pairs of impaling knives 55. The onions normally engage a table or plate 73 which is parallel with the lower run of the chain 54 and thus they will generally not be removed from the impaling blades by any action of the cutting knives 71 and 72.

The cutting knives 71 are identical and are mounted upon tubular members 74 which are resiliently mounted for movement toward and away from each other by resilient springy members 75 which are mounted to a cross-head assembly 76. The knives 71 consist of body members 77 to which a single adjustable blade 78 is secured. The members 77 also support a pair of substantially identical shoes 79 which extend forward (with respect to the path of travel of the onion) of the knife blades 78. Thus, as the onion is advanced toward the blades 78 they will first engage the shoes 79 and urge the body members 77 away against the resiliency of the mounting members 75. The root and crown portions will be severed by the knives 78, the root and crown portions being normally discharged at that point and through the slots between the blades 77 and the rear or back end of the shoes 79.

The onions are next advanced by the knives 55 past a rubber wiper assembly which consists of a sheet rubber member 80 which is mounted in a metal frame 80a and supported from blade 51 by lugs 80b. The rubber member 80 is provided with a slot 80c whose side edges engage the onion and remove the severed slices therefrom. The table or plate 73 may be divided into portions 73a and 73b to accommodate the wiper sheet 80 or the portion 73a may be attached to and supported by the frame 80a. The slot 80c is narrow and even a small onion passing therethrough will deform the sheet 80 and literally be squeezed through the slot. The onions then pass between a second set of knives 72 which are provided with shoes 81 and, as illustrated in Figure 4, each member is provided with a pair of blades 82 and 83 which serves to cut two parallel slices from the remainder of the onion.

The assemblies 72 are likewise mounted on similar tubular members 84 which are likewise supported by resilient tabs 85 from the head assembly 76. The head assemblies 76 are mounted for reciprocation. The members 76 are slidably mounted upon a pair of vertical shafts 86 which are mounted upon the supporting framework generally as illustrated in Figure 5.

The heads 76 are caused to reciprocate by a pair of connecting rods 87 which are pivotally connected thereto at 88 and which are actuated by a pair of cams 89 on cross shaft 90. The cross shaft 90 is suitably journaled at 91 as indicated particularly in Figure 3. The shaft 90 is driven by sprocket 92, chain 93, sprocket 94 and motor 95. The motor 95 causes the shaft 90 to rotate very rapidly thus imparting rapid rectilinear motion to the knives and cutting mechanism 70 entirely independently of the rate of advance of the conveyer 10, elevator mechanism 20, horizontal conveyer 30 and impaling mechanism 50. The two drives are independent.

As illustrated in Figure 3 the tubular members 74 which support the assemblies 77 and the shoes 79 are normally urged toward each other by a spring 96 which is secured to the members 74 and which passes through a slot in the blade 51.

Operation of the entire device may briefly be described as follows:

Unsized onions are dumped in the conveyer assembly 10 and are advanced along the bottom wall 11 thereof by an endless conveyer belt 12. The onions drop through openings in the side wall 13 and are engaged by the upwardly advancing paddles 21 of the elevator assembly 20. The onions are lowered by the elevator assembly 20 onto the horizontal conveyer member 30 as has previously been described. As the onions are advanced by the horizontal conveyer 30 they are repositioned manually by the operator in such a manner that the longitudinal axis, or the axis defined by the root and crown portions, is transverse to the path of travel of the conveyer frame. The onions are then advanced by the conveyer 30 to a position in which each succeeding onion will be engaged by a pair of the impaling knives or blades 55 which are advanced at the same rate as the onions. Since the plane of travel of the impaling knives 55 is at an angle to the plane of travel of the onions on the horizontal conveyer assembly 30, the knives 55 will be urged into the onions so that they will be carried from the horizontal conveyer assembly 30 to the cutting zone. The onions are advanced by the impaling knives 55 along the table 73 to a point at which the onions engage the shoes 79 of the first set of knives 71. The knives are normally urged toward each other by the spring 96 but the passage of onions between the shoes 79 urges the resilient supporting members 74 apart. The knives 78 are reciprocated rapidly as has previously been pointed out through the operation of the motor 95 thus severing the root and crown portions as illustrated in the right hand side of Figure 4.

When the root and crown portions have been severed by the reciprocating action of the knives 78, they will either drop immediately into the carry-off ducts 101 or they will be wiped from the advancing onion by the rubber wipers 80 and will automatically fall into the carry-off duct 101. The onions will then be advanced to the knife assembly 72. They will engage the shoes 81 and urge the knives 82 and 83 apart. However the knives 82 and 83 will engage the onion as it passes between the sets of knives and will sever two substantially uniform slices from each end of the onion. These slices will fall downwardly into the carry-off conduit 102. As the onions are further advanced they will engage the cam or guard member 56a and as the knives move to the right, as viewed in Figure 1, the onion will be urged from the impaling knives 55 by virtue of their engagement with the edge of the member 56a and will be deposited into the carry-off conveyer 103.

In the foregoing description we have attempted to describe our device with particular reference to the unique portions thereof and have not described in great detail such more or less mechanical features as frame construction, the specific mounting of the shafts, etc., other than in their relationship to the remainder of the parts. It is to be understood that the frame and shaft mountings, etc. do not form a part of this invention and may be altered as mechanical expediency might dictate or as the utilization of the machine in a particular plant may require. For example it is not beyond the realm of possibility that a particular plant might require a particular form of framework whereas another would utilize a separate form. However the fundamentals of the invention would remain the same in any instance.

We claim:

1. In an onion handling machine, feed conveyer means adapted to move onions in a predetermined spaced relation and in a horizontal plane, an impaling mechanism comprising a plurality of impaling knives, reciprocating adjustable severing knives, means to move the impaling knives in a vertical plane to impale onions and in a horizontal plane to advance them into engagement with the severing knives, said severing knives operating on the advancing onions to sever unwanted roots and crowns therefrom, resilient means for wiping the roots and crowns from impaled portions of said onion, additional knife means for severing and removing slices from said impaled portions, and cam means extending in a vertical plane and adapted to engage the remaining impaled portions of the onions to remove the same from said impaling knives.

2. In an onion handling machine, means for advancing onions at a predetermined rate and at predetermined intervals to an impaling mechanism overlying the discharge end of said advancing means, said impaling mechanism comprising a guide bar adapted to accommodate an endless chain, said guide bar being inclined with respect to said advancing means, a plurality of impaling knives mounted on said chain and adapted by said guide bar to impale onions as the same are advanced into engagement therewith by said advancing means, a plurality of reciprocating severing knives positioned on opposite sides of the path of said impaling knives and of said onions, means for removing slices severed from an onion by said severing knives, cam means adjacent said guide bar and adapted to engage the onion and remove the same from said impaling knives as they are advanced over said cam, and common means for driving said advancing means and said endless chain.

3. In an onion handling machine, means for advancing onions, an impaling mechanism overlying said advancing means, said mechanism comprising a guide bar adapted to accommodate an endless chain, said guide bar being inclined with respect to said advancing means, impaling knives positioned on said chain and adapted by said guide bar to impale an onion as the same is advanced by said advancing means under said impaling mechanism, a pair of reciprocating severing knives, each of said severing knives being placed on opposite sides of the path of said impaling knives and in the paths of the impaled onions, mounting means for said pair of severing knives adapting the same to be urged toward one another, said mounting means including onion engaging shoes positioned in advance of said knives, whereby they are urged apart a distance equivalent to the dimension of wanted portions of the onions, said severing knives acting only to remove unwanted roots and crowns, cam means adapted to engage the wanted portions of the onions to remove the same from said impaling knives as they are advanced past said cam means, and common driving means for actuating said advancing means and said endless chain.

References Cited in the file of this patent

UNITED STATES PATENTS

| | | |
|---|---|---|
| 1,315,381 | Merchant | Sept. 9, 1919 |
| 1,926,965 | Bem | Sept. 12, 1933 |
| 2,236,075 | Siemann | Mar. 25, 1941 |
| 2,383,228 | Thompson | Aug. 21, 1945 |
| 2,445,881 | Hemmeter | July 27, 1948 |
| 2,553,519 | Lenz | May 15, 1951 |

FOREIGN PATENTS

| | | |
|---|---|---|
| 650,653 | Great Britain | Feb. 28, 1951 |